(12) United States Patent
Hsu et al.

(10) Patent No.: US 8,793,711 B2
(45) Date of Patent: Jul. 29, 2014

(54) TRAY LOCKING DEVICE FOR OPTICAL DISC DRIVE

(75) Inventors: Cheng-Chung Hsu, Hsinchu (TW);
Yung-Han Wu, Hsinchu (TW);
Sz-Shian He, Hsinchu (TW);
Ming-Chun Tsao, Hsinchu (TW);
In-Shuen Lee, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 221 days.

(21) Appl. No.: 13/567,104

(22) Filed: Aug. 6, 2012

(65) Prior Publication Data

US 2013/0298144 A1 Nov. 7, 2013

(30) Foreign Application Priority Data

May 3, 2012 (CN) .......................... 2012 1 0134466

(51) Int. Cl.
*G11B 17/04* (2006.01)
*G11B 17/05* (2006.01)

(52) U.S. Cl.
USPC ............ 720/610; 720/601; 720/608; 720/657

(58) Field of Classification Search
USPC .................................. 720/601, 608, 610, 657
See application file for complete search history.

(56) References Cited

U.S. PATENT DOCUMENTS

| 8,424,027 B1* | 4/2013 | Hsu et al. ...................... 720/610 |
| 8,424,028 B1* | 4/2013 | Hsu et al. ...................... 720/610 |
| 2012/0174134 A1* | 7/2012 | Kim et al. ...................... 720/610 |

* cited by examiner

*Primary Examiner* — Craig A. Renner
*Assistant Examiner* — Carlos E Garcia
(74) *Attorney, Agent, or Firm* — Jianq Chyun IP Office (57) ABSTRACT

A tray locking device adapted to an optical disc drive for locking and releasing a tray is provided. The optical disc drive has an optical head connected to a lead screw and driven to move by the lead screw. The tray locking device includes a pushing member driven to move by the lead screw, a latching hook for locking and releasing a protruding pin, and a transmission assembly configured between the pushing member and the latching hook. The transmission assembly includes a first rod and a second rod movably configured in the tray. The first rod has a first driving portion, and the second rod has a second driving portion. When the transmission assembly is located at an initial position, the first driving portion is located on a moving path of the pushing member, while the second driving portion is not located on the moving path of the pushing member.

9 Claims, 9 Drawing Sheets

TRAY LOCKING DEVICE FOR OPTICAL DISC DRIVE

CROSS-REFERENCE TO RELATED APPLICATION

This application claims the priority benefit of China application serial no. 201210134466.1, filed on May 3, 2012. The entirety of the above-mentioned patent application is hereby incorporated by reference herein and made a part of this specification.

BACKGROUND OF THE INVENTION

1. Field of the Invention

The invention relates to an optical disc drive, and more particularly to a tray locking device for an optical disc drive.

2. Description of Related Art

With the advancement of computer technology, data types that can be processed by computers are increased, and the required storage capacity is also correspondingly expanded. Since an optical disc has advantages of reasonable price, portability, large storage capacity, easy data preservation, and long duration of data preservation, and the optical disc may ensure data invulnerability, the optical disc has gradually replaced the conventional magnetic recording medium and becomes an indispensable optical storage medium in modern life. As the optical discs are extensively applied, optical disc drives used for reading data from the optical discs have become indispensable electronic products in daily life as well.

Generally, an optical head is configured in an optical disc drive, and the optical head is driven by driving devices (e.g., lead screws) to move back and forth, so that the optical head is capable of reading data stored in the optical disc held by a tray. In addition to the driving devices (e.g., lead screws), a tray locking device is also required in the optical disc drive for locking the tray in the optical disc drive. When a disc ejecting command is issued, the tray is released and ejected from the optical disc drive, and thereby a user can easily place an optical disc onto the tray or remove an optical disc from the tray.

In a conventional optical disc drive, an electromagnetic plunger or a motor is often applied to control the locking mechanism or the releasing mechanism of the tray. An excessive number of devices within the optical disc drive, however, significantly occupy the inner space of the optical disc drive, which is unfavorable to the miniaturization of the optical disc drive. Moreover, the manufacturing costs may be raised.

SUMMARY OF THE INVENTION

The invention is directed to a tray locking device adapted to an optical disc drive. The tray locking device may reduce the number of the devices within the optical disc drive as well as economize the inner space of the optical disc drive. Further, the tray locking device may be conducive to effective reduction of manufacturing costs.

In an embodiment of the invention, a tray locking device adapted to an optical disc drive for locking and releasing a tray is provided. The optical disc drive has an optical head that is connected to and engaged with a lead screw. The optical head is driven and then moved by the lead screw. The tray locking device includes a pushing member driven to moved by the lead screw, a latching hook for locking and releasing a protruding pin, and a transmission assembly configured between the pushing member and the latching hook. The transmission assembly includes a first rod and a second rod that are movably configured in the tray. The first rod has a first driving portion, and the second rod has a second driving portion. When the transmission assembly is located at an initial position, the first driving portion is located on a moving path of the pushing member, while the second driving portion is not located on the moving path of the pushing member. When the tray is to be ejected, the lead screw drives the pushing member to push the first driving portion, such that the first rod drives the second rod to move, and that the second driving portion is moved to the moving path of the pushing member.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
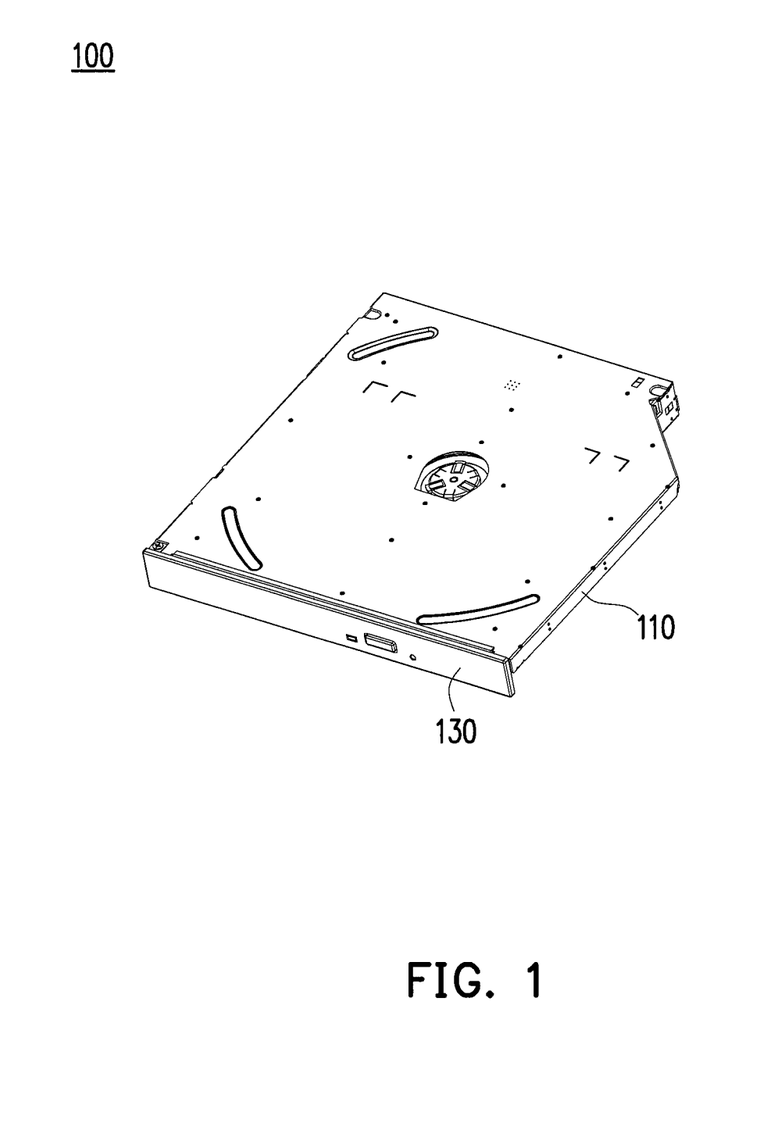
FIG. 1 is a three-dimensional view illustrating an optical disc drive according to an embodiment of the invention.
Figure 2:
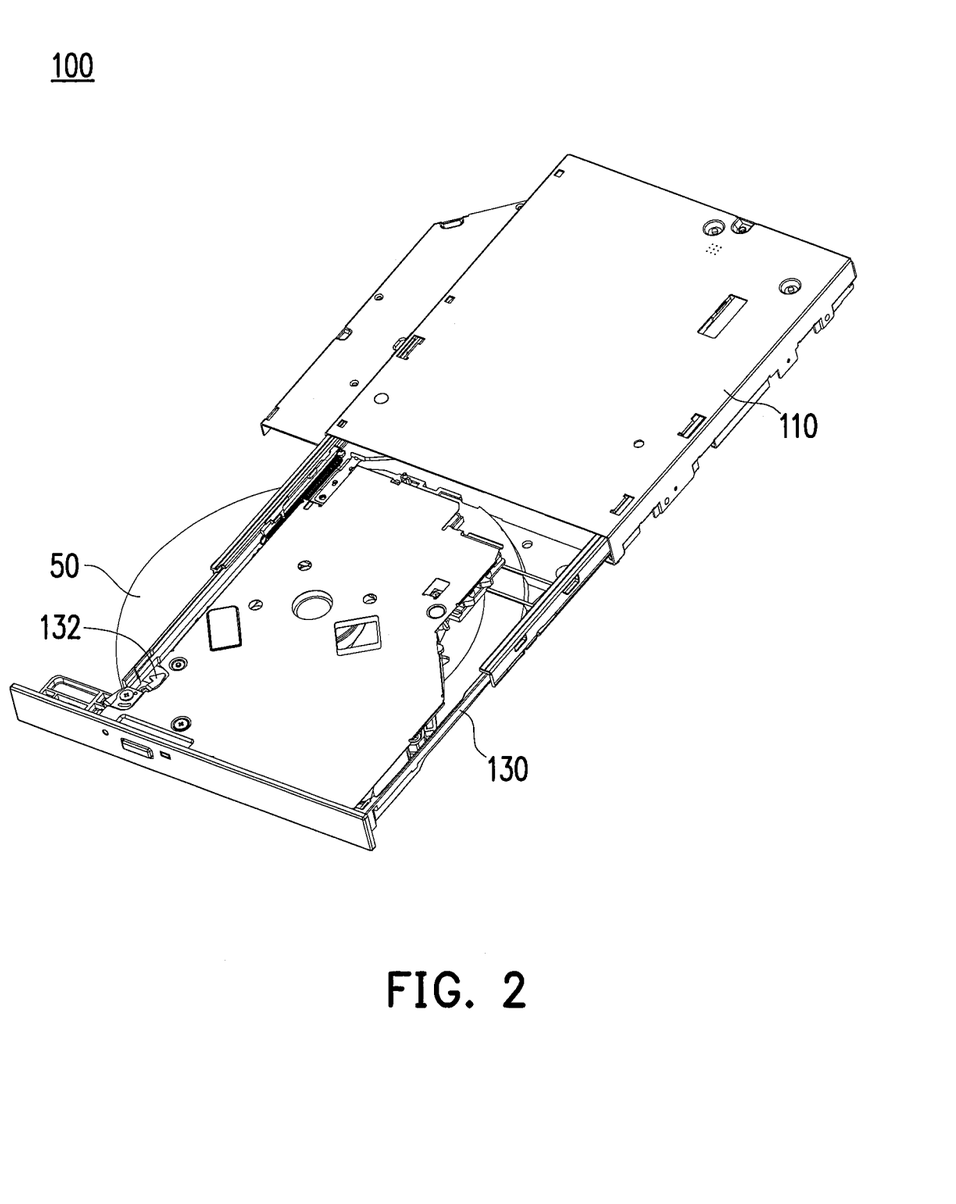
FIG. 2 schematically shows that the tray depicted in FIG. 1 is ejected from the optical disc drive.
Figure 3:
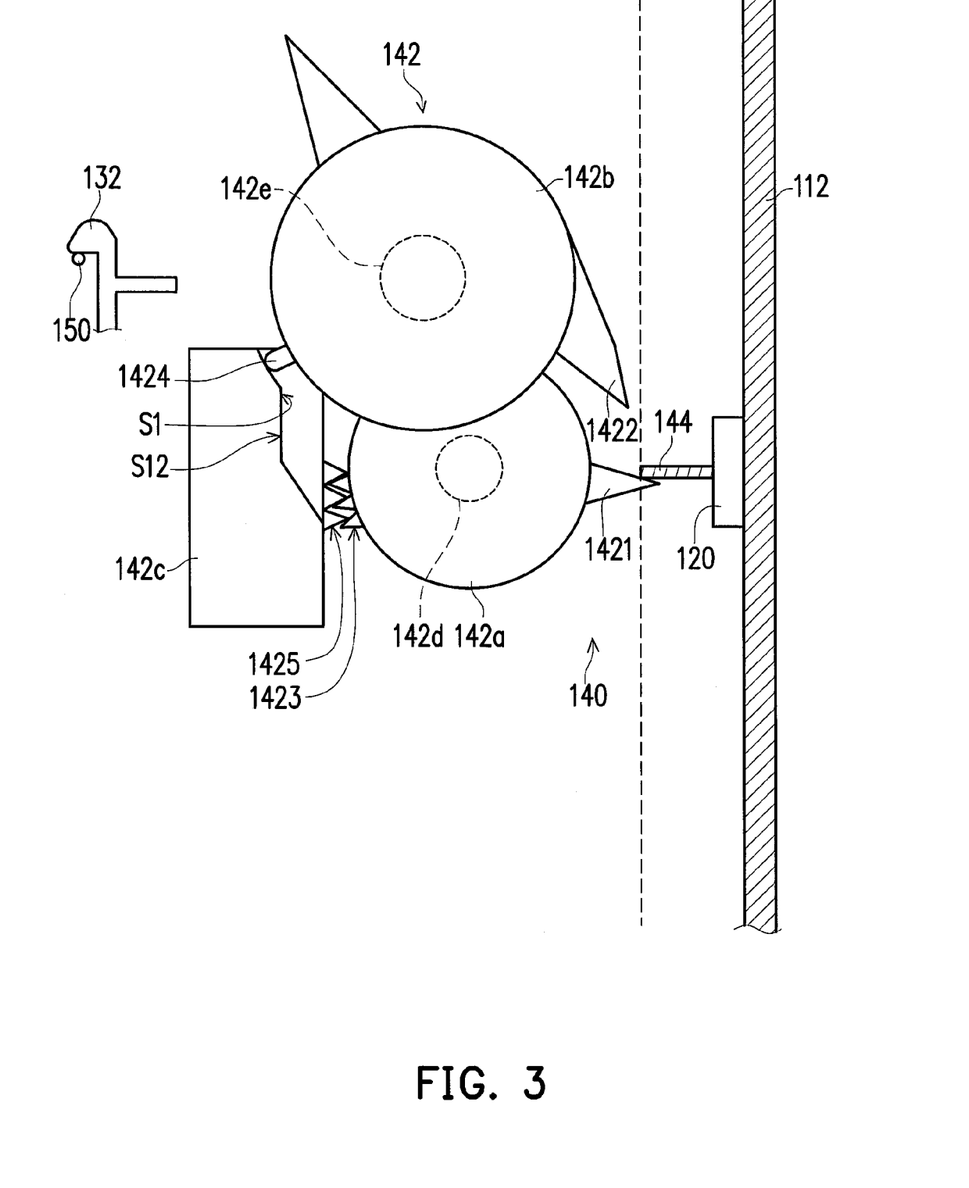
FIG. 3 is a schematic view illustrating a tray locking device of the optical disc drive depicted in FIG. 1.

FIG. 1 is a three-dimensional view illustrating an optical disc drive according to an embodiment of the invention. FIG. 2 schematically shows that the tray depicted in FIG. 1 is ejected from the optical disc drive. FIG. 3 is a schematic view illustrating a tray locking device of the optical disc drive depicted in FIG. 1. With reference to FIG. 1 to FIG. 3, the optical disc drive 100 described in the present embodiment includes a casing 110, an optical head 120, a tray 130, a lead screw 112, and a tray locking device 140. The optical head 120 is connected to and engaged with the lead screw 112. When the lead screw 112 rotates, the lead screw 112 drives the optical head 120, such that the optical head 120 is relatively moved on the lead screw 112. The tray 130 is movably configured in the casing 110 and has a locking position (shown in FIG. 1) and a ejecting position (shown in FIG. 2).

The tray locking device 140 described herein includes a transmission assembly 142, a pushing member 144, and a latching hook 132. The latching hook 132 is pivoted in the tray 130 for latching and releasing a protruding pin 150 and further locking and releasing the tray 130. The pushing member 144 is configured on the optical head 120. Besides, the pushing member 144 and the optical head 120 are driven and then moved by the lead screw 112. The transmission assembly 142 is configured between the pushing member 144 and the latching hook 132. Here, the pushing member 144 may push the transmission assembly 142, such that the transmission assembly 142 may drive the latching hook 132 to rotate. Thereby, the latching hook 132 releases the protruding pin 140 and allows the tray 130 to be ejected from the casing 110.

In an embodiment of the invention, the tray locking device 140 is configured on the tray 140, and the protruding pin 150 is configured on the casing 110. Therefore, when the latching hook 132 of the tray locking device 140 latches the protruding pin 140, the tray 130 is also locked in the casing 110; when the latching hook 132 releases the protruding pin 150, the tray 130 is ejected from the casing 110.

As shown in FIG. 3, the transmission assembly 142 includes a first rod 142a, a second rod 142b, and a sliding element 142c. The first rod 142a is movably configured in the tray 130 and has a first driving portion 1421 and a first gear part 1423. The first driving portion 1421 is located on a moving path of the pushing member 144. The second rod 142b is movably disposed in the tray 130 and has a second driving portion 1422 and a protrusion 1424. The sliding element 142c is slidably configured in the tray 130 and has a second gear part 1425 and a guiding surface S1. The second gear part 1425 and the first gear part 1423 are engaged with each other. The protrusion 1424 of the second rod 142b leans against the guiding surface S1 of the sliding element 142c.

When the sliding element 142c moves, the guiding surface S1 drives the protrusion 1424, such that the protrusion 1424 is relatively moved on the guiding surface S1, and that the second rod 142b is correspondingly moved. The guiding surface S1 has an equilibrium region S12. When the protrusion 1424 is relatively moved on the guiding surface S1 to the equilibrium region S12 and then leans against the equilibrium region S12, the first rod 142a, the second rod 142b, and the sliding element 142c are in a state of force equilibrium. That is, when the protrusion 1424 leans against the equilibrium region S12, the first rod 142a, the second rod 142b, and the sliding element 142c are in a still state if no external force is applied.

According to the present embodiment, the transmission assembly 142 further includes a plurality of elastic elements 142d and 142e for providing an elastic force to the first rod 142a, the second rod 142b, and the sliding element 142c, such that the transmission assembly 142 returns to the initial position, as shown in FIG. 3.

The transmission assembly described herein is configured between the pushing member and the latching hook. Besides, the transmission assembly is driven by the pushing member and then moves the latching hook. The tray releasing process is further described below.

Figure 4A:
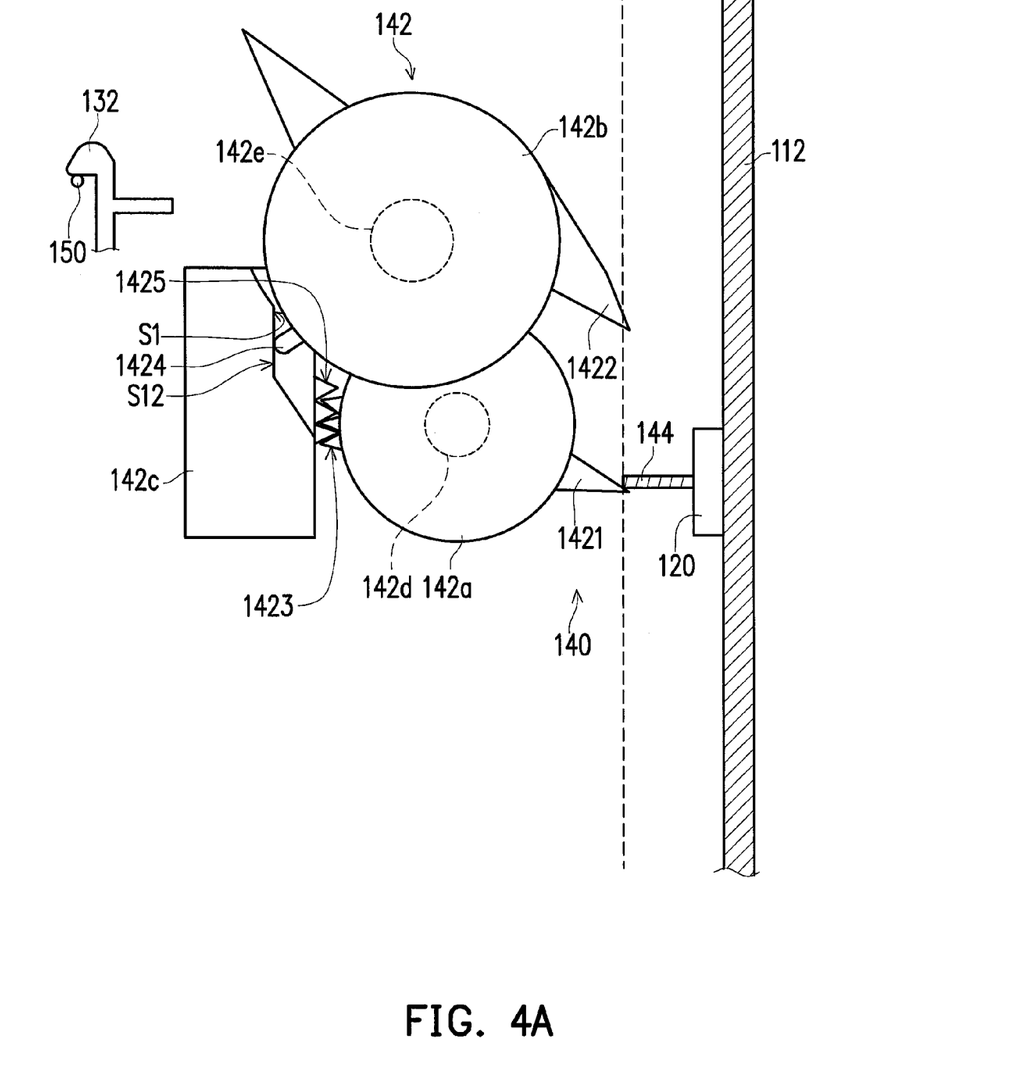
FIG. 4A and FIG. 4B are flowcharts illustrating a tray releasing process of the tray locking device depicted in FIG. 3.
Figure 4B:
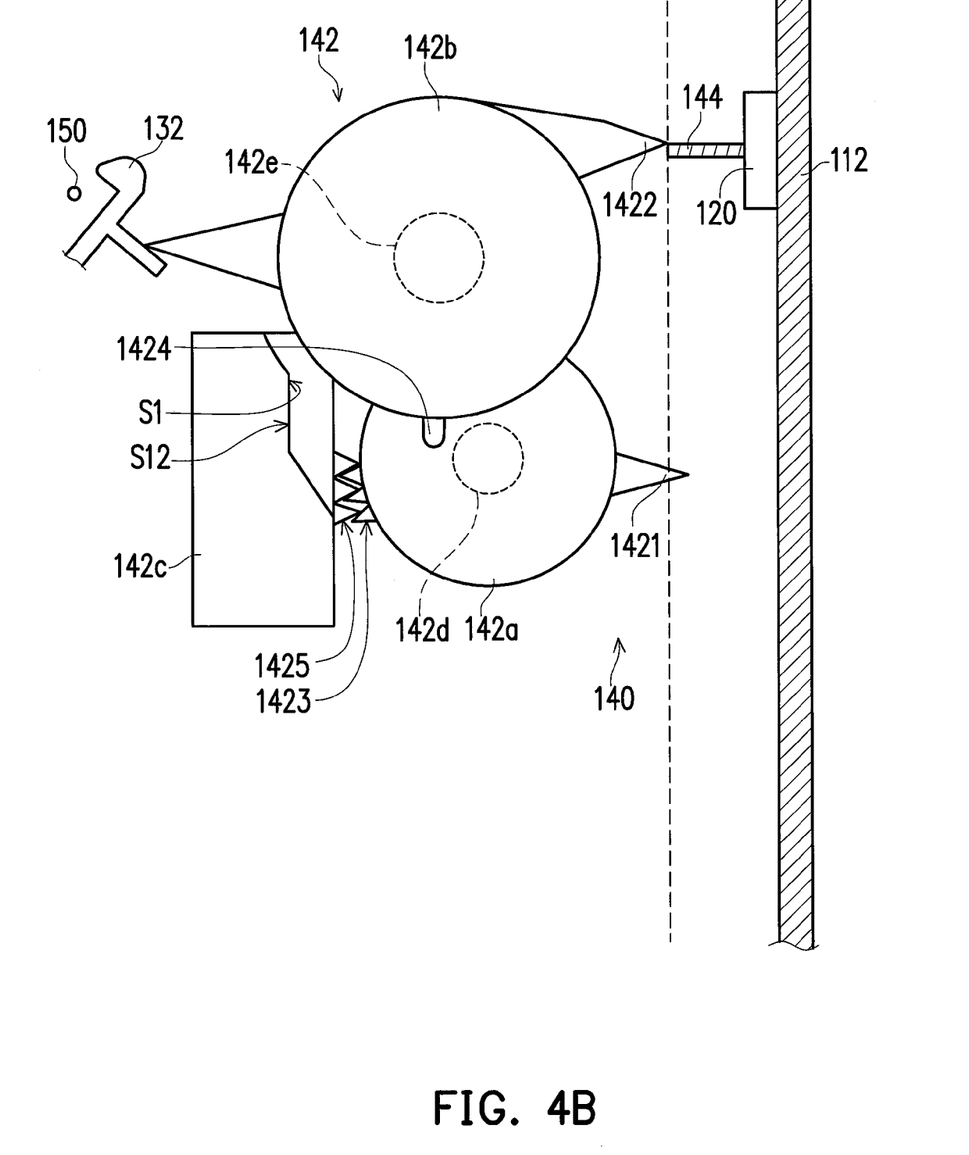

FIG. 4A and FIG. 4B are flowcharts illustrating a tray releasing process of the tray locking device depicted in FIG. 3. When the optical disc drive 100 reads an optical disc 50, the lead screw 112 simultaneously drives the optical head 120 and the pushing member 144 to move, so as to read data from the optical disc 50. At this time, the tray 130 is locked in the casing 110, i.e., the latching hook 132 latches the protruding pin 150.

When the tray 130 is to be ejected from the casing 110, the lead screw 112 drives the optical head 120 and the pushing member 144 to move, such that the pushing member 144 pushes the first driving portion 1421 of the first rod 142a and moves the first rod 142a. Meanwhile, through the engagement between the first gear part 1423 and the second gear part 1425, the first rod 142a drives the sliding element 142c to move, allows the protrusion 1424 of the second rod 142b to relatively move on the guiding surface S1, and further drives the second rod 142b to move. When the second rod 142b is driven to move the second driving portion 1422 to the moving path of the pushing member 144, as indicated in FIG. 4A, the lead screw 112 stops moving the optical head 120 and the pushing member 144. At this time, the protrusion 1424 of the second rod 142b leans against the equilibrium region S12 of the guiding surface S1. In other words, the first rod 142a, the second rod 142b, and the sliding element 142c are in the state of force equilibrium.

According to an embodiment of the invention, when the protrusion 1424 of the second rod 142b leans against the equilibrium region S12 of the guiding surface S1, the first rod 142a, the second rod 142b, and the sliding element 142c are in the state of force equilibrium, and the second driving portion 1422 of the second rod 142b is located on the moving path of the pushing member 144.

After that, the lead screw 112 again drives the optical head 120 and the pushing member 144 to move in an opposite direction, such that the pushing member 144 pushes the second driving portion 1422 of the second rod 142b, moves the second rod 142a, and drives the latching hook 132 to release the protruding pin 150, as illustrated in FIG. 4B. Thereby, the tray 130 is released and ejected from the casing 110.

When the lead screw 112 drives the optical head 120 and the pushing member 144 to move in an opposite direction, and the pushing member 144 is moved away from the first driving portion 1421 to the second driving portion 1422, i.e., the pushing member 144 is located between the first driving portion 1421 and the second driving portion 1422, the first rod 142a, the second rod 142b, and the sliding element 142c are not moved. This is because the protrusion 1424 of the second rod 142b leans against the in the equilibrium region S12 of the guiding surface S1 to maintain the first rod 142a, the second rod 142b, and the sliding element 142c to be in the state of force equilibrium.

When the pushing member 144 pushes the second driving portion 1422 of the second rod 142b to move the second rod 142b, the protrusion 1424 of the second rod 142b is taken away from the equilibrium region S12, and the first rod 142a, the second rod 142b, and the sliding element 142c are no longer in the state of force equilibrium. Therefore, the first rod 142a and the sliding element 142c are affected by the elastic force exerted by the elastic element 142d and then return to the initial position.

After that, when the pushing member 144 pushes the second driving portion 1422 of the second rod 142b away from the moving path of the pushing member 144, and the pushing member 144 crosses over the second driving portion 1422, the second rod 142b is affected by the elastic force exerted by the elastic element 142e and then returns to the initial position, as shown in FIG. 3.

In the tray locking device described in the present embodiment, the lead screw 112 not only can move the optical head 120 to read data from the optical disc 50 but also can drive the pushing member 144 to push the transmission assembly 142, such that the transmission assembly 142 moves the latching hook 132 to release and eject the tray 130 from the casing 110. Namely, since the inherent lead screw 112 of the optical disc drive is applied to drive the tray locking device, the inner space of the optical disc drive 100 may be economized, and the manufacturing costs may be reduced as well.

In addition, when the optical head 120 is moved and approaches the first driving portion 1421 of the first rod 142a, and if an impact is exerted to the optical disc drive 100 at this time, it is very likely for the pushing member 144 to erroneously push the first driving portion 1421, and thereby the second driving portion 1422 of the second rod 142b is moved to the moving path of the pushing member 144. As such, when the optical head 120 is intended to be move back to the position where the optical head 120 can read data from the optical disc 50, the pushing member 144 would be driven to push the second driving portion 1422, and thereby the tray 130 would be mistakenly released and ejected from the casing 110.

To prevent the tray 130 from being mistakenly released, the tray locking device 140 described in the present embodiment has an impact processing mechanism. FIG. 5A to FIG. 5D are flowcharts illustrating that the tray locking device depicted in FIG. 3 bears an impact and is then operated.

When the optical head 120 is moved and approaches the first driving portion 1421 of the first rod 142a (show in FIG. 3), and if an impact is exerted to the optical disc drive 100 at this time, the optical disc drive 100 compulsively drives the lead screw 112, such that the lead screw 112 drives the pushing member 144 to continuously push the first driving portion 1421 of the first rod 142a until the pushing member 144 crosses over the first driving portion 1421.

Figure 5A:
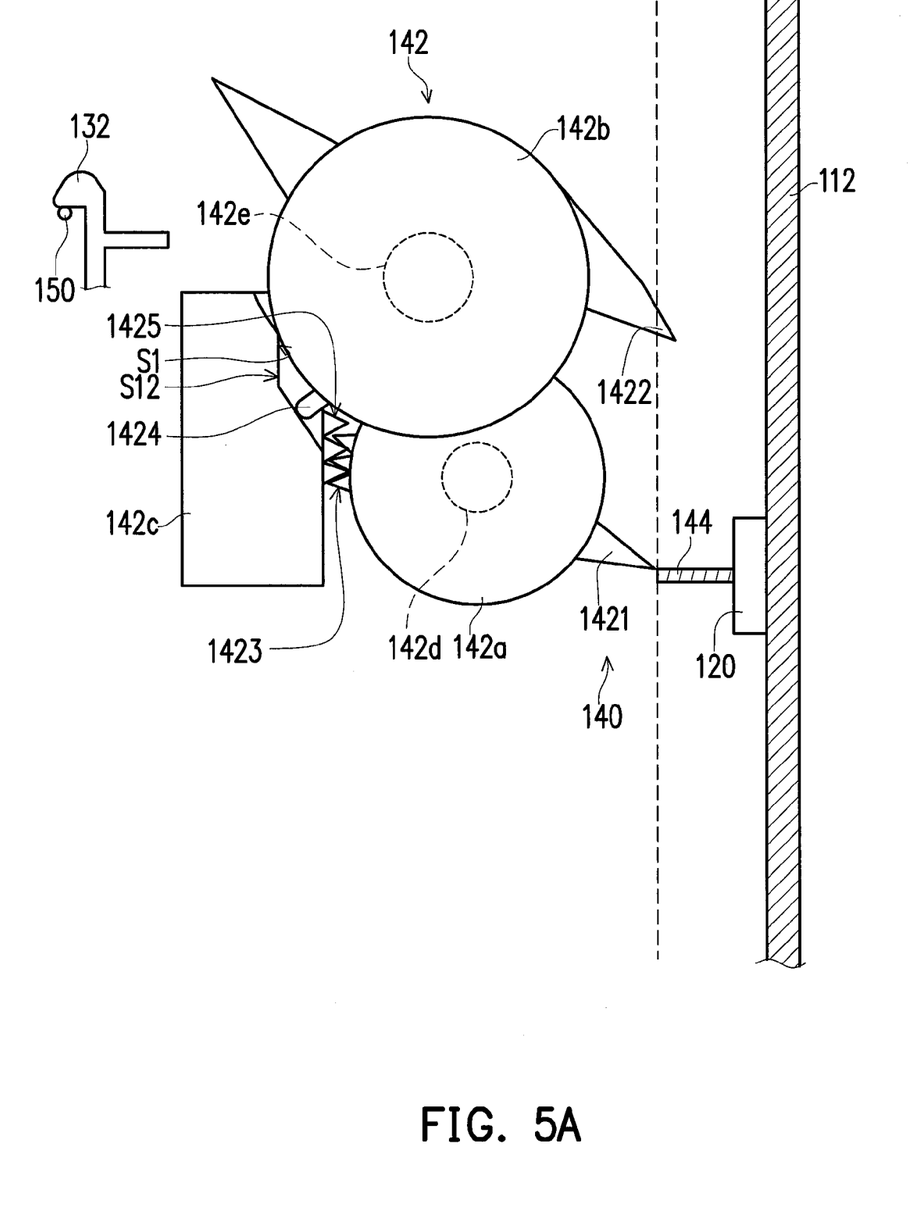
FIG. 5A to FIG. 5D are flowcharts illustrating that the tray locking device depicted in FIG. 3 bears an impact and is then operated.
Figure 5B:
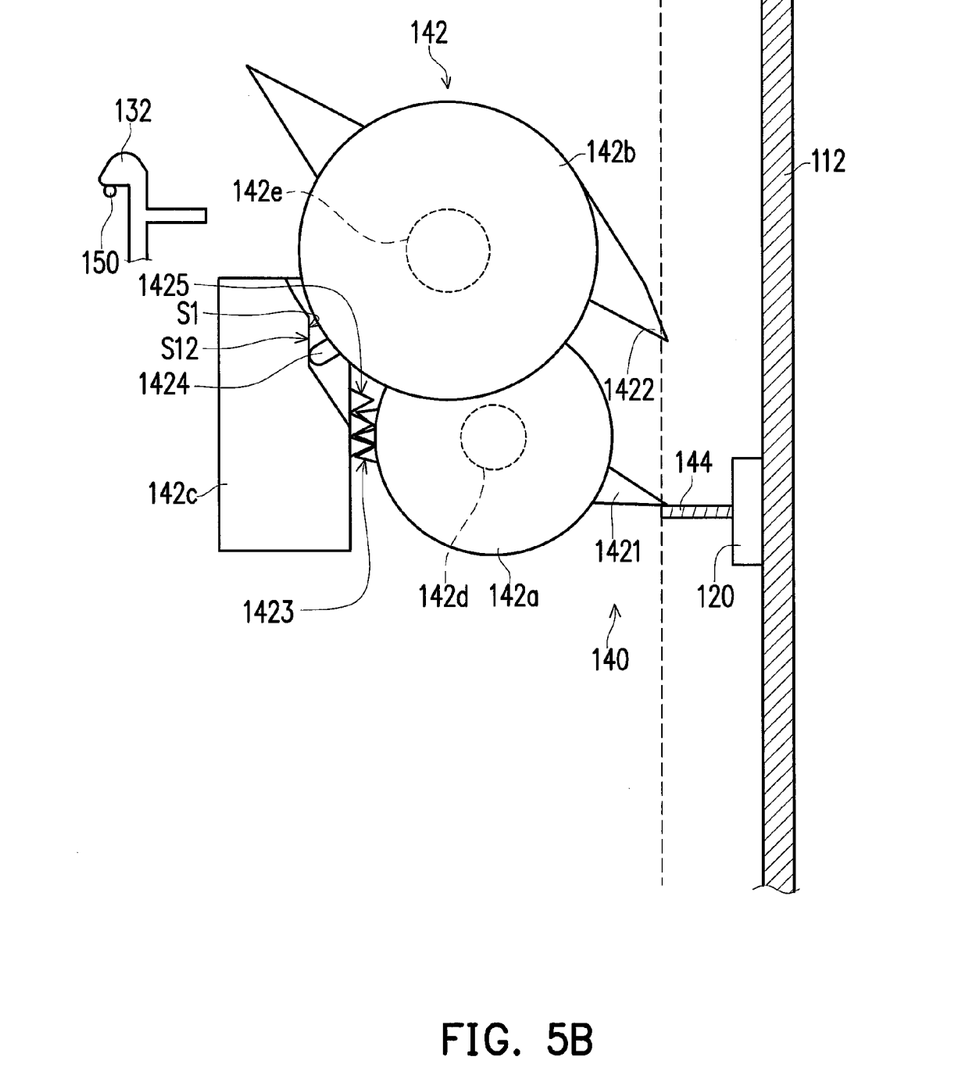

As indicated in FIG. 5A, when the pushing member 144 continuously pushes the first driving portion 1421, the first rod 142a driven by the pushing member 144 moves the sliding element 142c and the second rod 142b, and thereby the protrusion 1424 of the second rod 142b leaves the equilibrium region S12 of the guiding surface S1. After the pushing member 144 crosses over the first driving portion 1421, the first rod 142a, the second rod 142b, and the sliding element 142c, which are affected by the elastic force exerted by the elastic elements 142d and 142e, may be shifted to the state of force equilibrium. This is similar to the state of force equilibrium experienced by the first rod 142a, the second rod 142b, and the sliding element 142c when the protrusion 1424 of the second rod 142b leans against the equilibrium region S12 of the guiding surface S1, as shown in FIG. 5B.

Figure 5C:
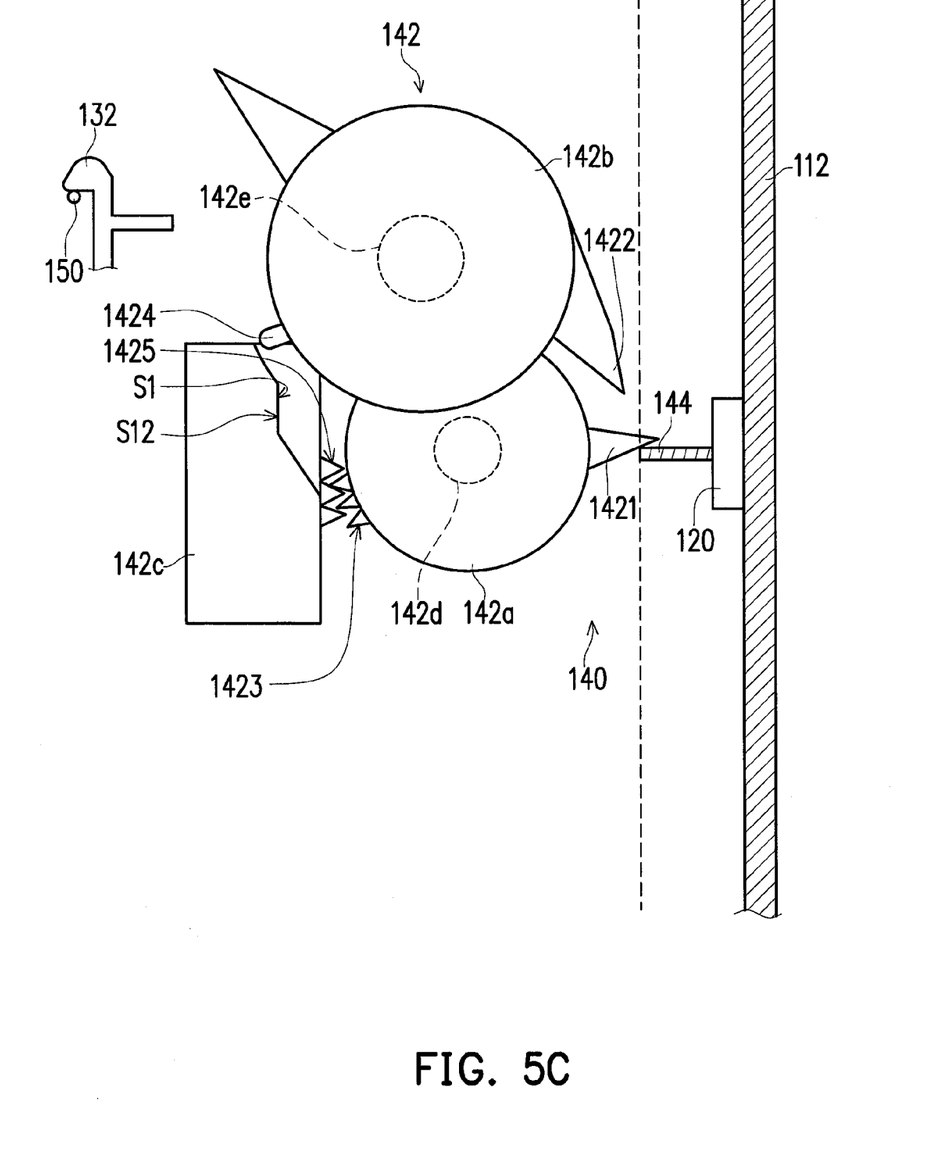
Figure 5D:
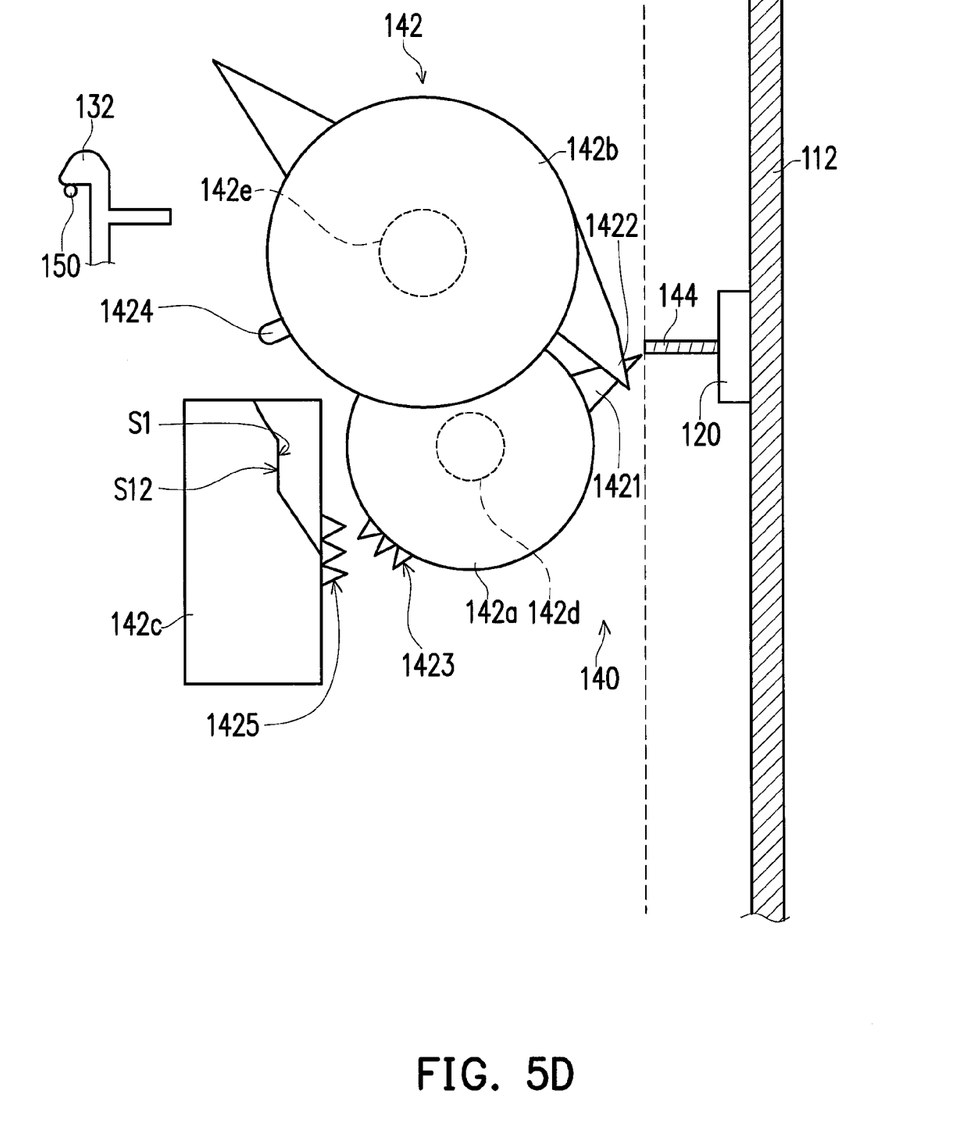

Next, as shown in FIG. 5C, the lead screw 112 again drives the pushing member 144 to push the first driving portion 1421 of the first rod 142a in an opposite direction and move the sliding element 142c and the second rod 142b to the initial position. Thereby, the second driving portion 1422 of the second rod 142b leaves the moving path of the pushing member 144. In this case, the pushing member 144 is not able to push the second driving portion 1422, and thus the tray 130 would not be erroneously released.

That is, when an external impact is exerted on the pushing member 144, and the pushing member 144 unexpectedly pushes the first rod 142a and drives the second driving portion 1422 of the second rod 142b to move to the moving path of the pushing member 144, the lead screw 112 is compulsively driven to push the pushing member 144, so that the pushing member 144 further pushes the first rod 142a and crosses over the first driving portion 1421 of the first rod 142a. If it is intended to move the pushing member 144 back to the initial position, the first rod 142a may be pushed in an opposite direction, so as to move the second driving portion 1422 of the second rod 142b away from the moving path of the pushing member 144. As a result, the optical disc drive 100 during operation can be prevented from accidentally releasing the tray 130.

In addition, a relative angle between the equilibrium region S12 of the guiding surface S1 and the protrusion 1424 of the second rod 142b is different from a relative angle between any other region of the guiding surface S1 and the protrusion 1424 of the second rod 142b. Hence, the normal force generated by the protrusion 1424 of the second rod 142b leaning against the equilibrium region S12 of the guiding surface S1 is greater than the normal force generated by the protrusion 1424 of the second rod 142b leaning against any other region of the guiding surface S1. As such, the friction between the equilibrium region S12 and the protrusion 1424 is greater than the friction between any other region of the guiding surface S1 and the protrusion 1424. Accordingly, if the elastic elements 142d and 142e with proper elastic modulus are applied, the friction between the equilibrium region S12 and the protrusion 1424 may be greater than the elastic force generated by the elastic elements 142d and 142e, such that the first rod 142a, the second rod 142b, and the sliding element 142c are in the state of force equilibrium. Moreover, the elastic force generated by the elastic elements 142d and 142e may be greater than the friction between any other region of the guiding surface S1 and the protrusion 1424; thus, through the elastic force generated by the elastic elements 142d and 142e, the first rod 142a, the second rod 142b, and the sliding element 142c can return to the initial position.

In view of the foregoing, the lead screw described in an embodiment of the invention not only can drive the optical head to read data from the optical disc but also can drive the tray locking device to release the tray, such that the tray is ejected from the optical disc drive. Namely, the optical head and the tray locking device share the same lead screw, thereby economizing the inner space of the optical disc drive and reducing manufacturing costs. Moreover, the tray locking device described in an embodiment of the invention has an impact processing mechanism. After the pushing member is driven to cross over the first rod, the pushing member is moved in an opposite direction to push the first rod, such that the sliding element and the second rod are driven and can return to the initial position. Thereby, the tray locking device is precluded from accidentally releasing the tray, and thus the tray would not be ejected from the optical disc drive without intent.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A tray locking device adapted to an optical disc drive for locking and releasing a tray, the optical disc drive having an optical head, the optical head being connected to a lead screw and driven to move by the lead screw, the tray locking device comprising:
    a pushing member driven to move by the lead screw;
    a latching hook for latching and releasing a protruding pin; and
    a transmission assembly configured between the pushing member and the latching hook, the transmission assembly comprising a first rod and a second rod, the first rod and the second rod being movably configured in the tray, the first rod having a first driving portion, the second rod having a second driving portion,
    wherein when the transmission assembly is located at an initial position, the first driving portion is located on a moving path of the pushing member, while the second driving portion is not located on the moving path of the pushing member,
    wherein when the tray is to be ejected, the lead screw drives the pushing member to push the first driving portion, such that the first rod drives the second rod to move, and that the second driving portion is moved to the moving path of the pushing member.

2. The tray locking device as recited in claim 1, wherein when the second driving portion is moved to the moving path of the pushing member, the lead screw drives the pushing member to move in an opposite direction and push the second driving portion, such that the second rod is driven to move the latching hook and release the protruding pin.

3. The tray locking device as recited in claim 1, wherein the transmission assembly further comprises a sliding element, the sliding element has a guiding surface, the guiding surface has an equilibrium region, the second rod has a protrusion, and when the protrusion of the second rod leans against the equilibrium region of the guiding surface, the transmission assembly is in a state of force equilibrium.

4. The tray locking device as recited in claim 3, wherein when the protrusion of the second rod leans against the equilibrium region of the guiding surface, the transmission assembly is in the state of force equilibrium, and the second driving portion is located on the moving path of the pushing member.

5. The tray locking device as recited in claim 1, wherein the transmission assembly further comprises a sliding element configured between the first rod and the second rod, and the first rod moves the second rod through the sliding element.

6. The tray locking device as recited in claim 5, wherein the first rod has a first gear part, the sliding element has a second gear part, and the first gear part and the second gear part are engaged with each other.

7. The tray locking device as recited in claim 5, wherein the sliding element has a guiding surface, the second rod has a protrusion leaning against the guiding surface, and when the sliding element moves, the guiding surface drives the protrusion of the second rod, such that the protrusion is relatively moved on the guiding surface, and that the second rod is correspondingly moved.

8. The tray locking device as recited in claim 1, wherein the transmission assembly further comprises a plurality of elastic elements for providing an elastic force, such that the transmission assembly returns to the initial position.

9. The tray locking device as recited in claim 1, wherein when an impact is exerted on the optical disc drive, the lead screw drives the pushing member to push the first driving portion and cross over the first driving portion, and then the lead screw again drives the pushing member to move in an opposite direction and push the first driving portion, such that the transmission assembly returns to the initial position.

* * * * *